Jan. 10, 1967 R. J. HULL 3,297,549
APPARATUS FOR TREATING MULTI-COMPONENT LIQUIDS
Filed May 14, 1964 2 Sheets-Sheet 1

INVENTOR.
RAYMOND JAMES HULL
BY
Christie, Parker & Hale
ATTORNEYS.

Jan. 10, 1967 R. J. HULL 3,297,549
APPARATUS FOR TREATING MULTI-COMPONENT LIQUIDS
Filed May 14, 1964 2 Sheets-Sheet 2

INVENTOR.
RAYMOND JAMES HULL
BY
ATTORNEYS.

United States Patent Office 3,297,549
Patented Jan. 10, 1967

3,297,549
APPARATUS FOR TREATING MULTI-COMPONENT LIQUIDS
Raymond James Hull, Orange, Calif., assignor to Gas Processors, Inc., Brea, Calif., a corporation of California
Filed May 14, 1964, Ser. No. 367,302
3 Claims. (Cl. 196—99)

The present invention relates to an apparatus and method for treating multi-component liquids and, particularly, to an apparatus and method for improving fractional separation of low-boiling components from high-boiling components while minimizing loss of high-boiling components from a liquid.

In the removal of low-boiling components or light fractions from multi-component liquids, distillation towers, commonly referred to as stabilizers, are used. Conventionally, liquid feed is heated in the bottom of the tower to vaporize low-boiling components which rise through a rectifying section in direct countercurrent relationship with downflowing liquid feed. Some portion of the higher-boiling components or heavier fraction in the liquid feed is also volatilized. Heat exchange between the cool liquid feed and the hot vaporized components within the rectifying section condenses some of the higher-boiling components in the vapor and vaporizes low-boiling components in the liquid feed. Nevertheless, substantial losses of high-boiling components can occur by carry-over of the uncondensed higher-boiling components as part of the overhead vapor leaving the tower.

To reduce the above-described losses, overhead condensers requiring cooling water or refrigeration have been used with stabilizers. In another system described in U.S. Patent No. 2,995,499, vapor is passed in indirect heat exchange relationship with a pool of liquid feed maintained around heat exchanger tubes disposed above the rectifying section. In the latter system, some condensation of higher-boiling components is achieved without the necessity for external cooling. However, no significant fractionation of the liquid feed is produced.

The apparatus and method of the present invention provide an improved arrangement for minimizing loss of higher-boiling components. The improvement is obtained because both condensation of higher-boiling components from heated vapor and additional fractional separation are achieved above a stripping section by reason of indirect heat exchange between liquid feed and the vapor over a substantial length of a column.

As to the process of the present invention, the improvement is obtained by downwardly flowing liquid feed in a column in indirect countercurrent heat exchange relationship with heated vaporized components of the liquid feed. This heat exchange occurs throughout a substantial vertical length within the column so that both fractional separation and condensation take place. The heat exchange takes place above a stripping step in which direct countercurrent heat exchange between the liquid feed and the heated vaporized components of the feed occurs within packing disposed above the liquid bottoms product.

As to apparatus, the present invention comprises an elongate vertical shell which includes a tubular downcomer disposed coaxially within the shell to form a first annular space between the shell and the downcomer. Means are disposed within the downcomer to form a second annular space between it and the downcomer. The second annular space extends over a substantial vertical length of the downcomer. Additional means are provided within the second annular space to distribute liquid flowing downwardly through the space after it enters the shell through a supply conduit. Heated vaporized components of the liquid feed rising through the first annular space are in indirect heat exchange relationship with downflowing liquid feed in the second annular space. Condensation and fractionation produced by this heat exchange occurs above packing within which direct heat exchange occurs between the rising vapor and downflowing liquid feed after the liquid feed leaves the second annular space.

Although the apparatus and process of the present invention may be utilized in the treatment of various multi-component liquids, their compactness and effectiveness are particularly useful in the treatment of natural gasoline. Such treatment is often required in remote locations or on sites where volume throughputs are too small to justify large units. Stabilizers are utilized to treat natural gasoline produced by rectification of natural gas in which dry gas is separated from the liquid product consisting of more readily condensable hydrocarbons. By the apparatus and process of the present invention, the $C_5+$ fraction in the overhead product from a stabilizer is substantially reduced. Loss of heavier fraction components from the liquid natural gasoline is significantly minimized.

The apparatus and method of the present invention will be more clearly understood from the following description taken in conjunction with the accompanying drawings in which.

Figure 2:
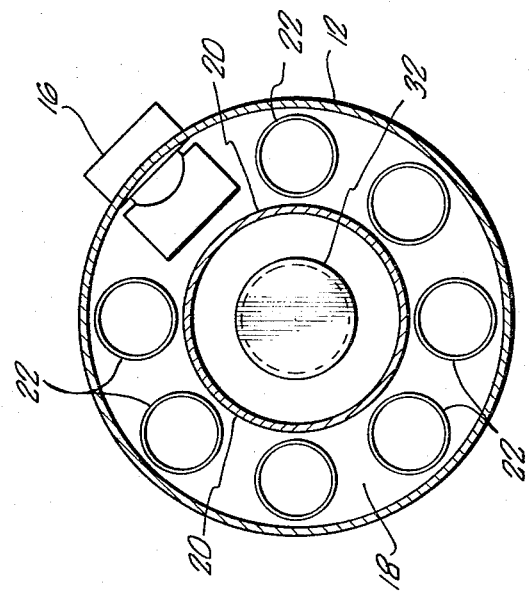
FIG. 2 is a cross-sectional view taken along line 2—2 of FIG. 1.
Figure 3:
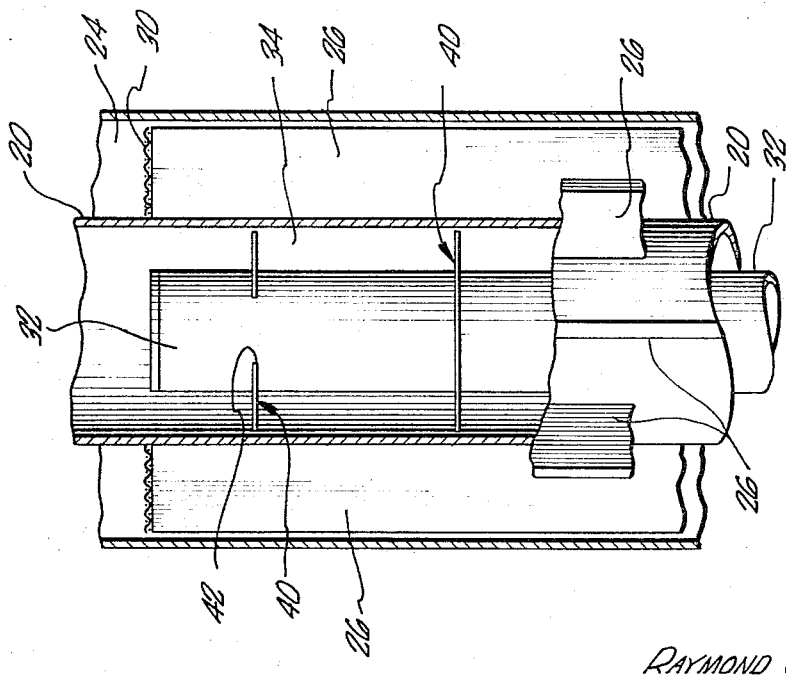
FIG. 3 is a fragmentary sectional elevation showing in enlarged detail a portion of the stabilizer.

With reference to the figures, a stabilizer 10 consists of an elongate vertical shell 12 closed at its longitudinal ends to form an enclosure 14. A liquid supply conduit 16 passes through the shell near the upper end of the enclosure above an annular tube ring 18. As particularly shown in FIG. 2, a tubular liquid downcomer 20 passes centrally through the tube ring and is supported by it near the upper end of the downcomer. A plurality of vapor tubes 22 are circumferentially spaced in the tube ring as the sole means of fluid passage through it. The vapor tubes extend above the vertical level at which the liquid supply conduit enters the enclosure. As shown in FIG. 2, one of the vapor tubes is eliminated so that space is provided for the portion of the liquid supply conduit extending into the enclosure.

Figure 1:
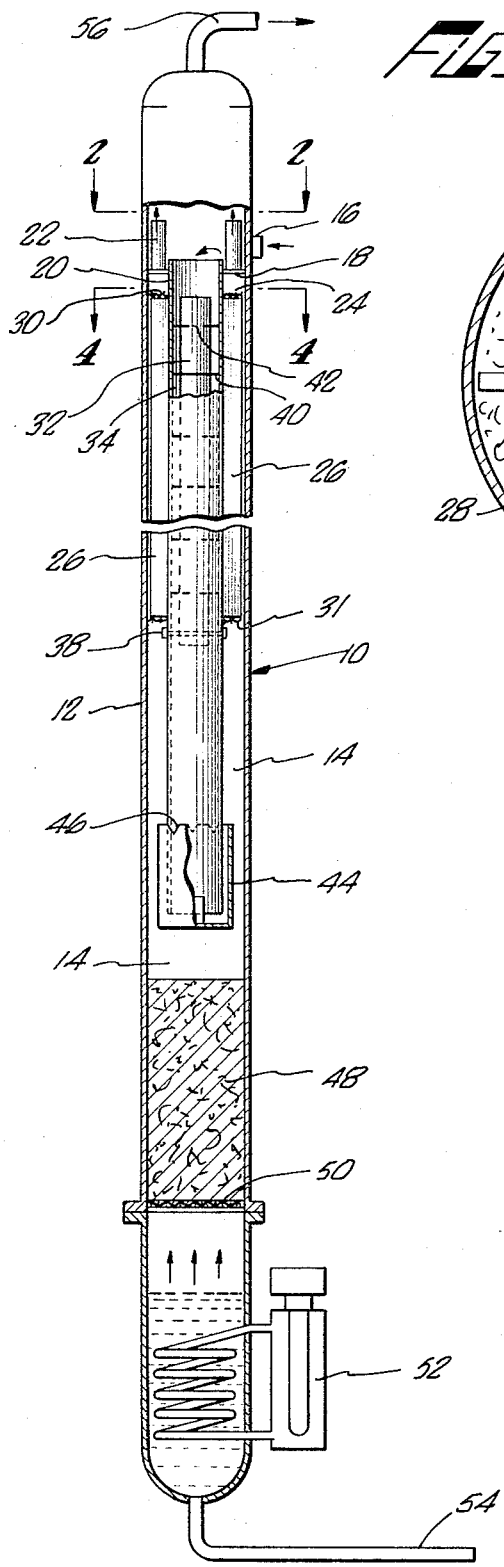
FIG. 1 is a sectional elevation showing a stabilizer in accordance with the present invention.
Figure 4:
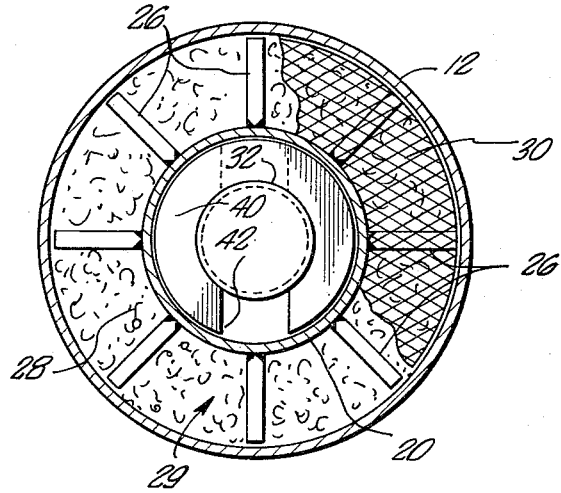
FIG. 4 is a cross-sectional view taken along line 4—4 of FIG. 1.

Downcomer 20 forms a first annular space 24 between the outside wall of the downcomer and the inside wall of shell 12. A plurality of vertical heat exchange fins 26 are secured around the circumference of the outside wall of the downcomer to extend radially into the first annular space. A series of vertical vapor passages 28 are formed between each pair of radially extending fins. The passages are filled with a suitable packing 29, such as aluminum pall rings. As particularly shown in FIG. 4, a wire screen 30 is tack-welded to the horizontal top faces of the fins to provide an upper retainer for the packing rings. A similar wire screen 31 is welded to the horizontal bottom faces of each of the fins to provide a lower retainer for the packing. The fins extend over a substantial portion of the length of the downcomer, for example, about 60% of a 10-foot downcomer in a 30-foot column.

Within the downcomer, a closed-ended tubular element 32 is coaxially disposed to form a second annular space 34 between the inner wall of the downcomer and the tubular element. The tubular element has a length generally corresponding to the length of heat exchange fins 26. It is supported within the downcomer by a pin 38.

Figure 5:
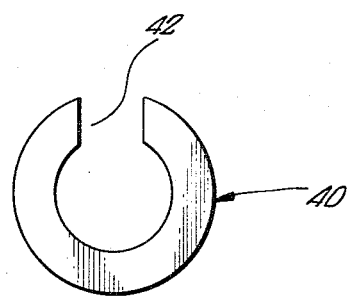
FIG. 5 is a plan view of a diverter plate removed from the column.

Means are provided in the second annular space between the tubular element and the downcomer to distribute fluid flow within the space. Although various baffle arrangements may be used, one that has been found effective includes a series of vertically spaced apart diverter plates 40. As particularly shown in FIG. 5, each diverter plate is an annular ring having a segment removed to leave a circumferential gap that is approximately 1/16 of the outer circumference. The inner diameter of each diverter plate provides a tight fit around tubular element 32. Their outer diameter is somewhat less than the inner diameter of the downcomer so that an annular space is provided which is sufficient to enhance film-like liquid flow along the inner wall of the downcomer. Gaps 42 in the diverter plates are oriented in successive plates so that changes in direction of flow occur between each pair of plates as fluid flows through the gaps.

A liquid reservoir 44 is disposed around the bottom end of the downcomer. The upper end of the reservoir is provided with V-notch weirs 46. Spaced below the bottom of the downcomer and its encompassing reservoir is a rectifying section constituting a packed section 48. As schematically illustrated, the packed column consists of a support ring 50 to hold the packing which may be Rachig rings, saddles, or the like. The center of the support ring includes perforations or screening to enable free flow of fluids through it.

A heater or reboiler 52 is placed near the bottom of the shell enclosure. A liquid outlet pipe 54 is in flow communication with the bottom of the enclosure. An overhead gas vapor pipe 56 is connected with the top end of the enclosure. Although not shown, the top end of the enclosure may be equipped with auxiliary equipment such as mist extractors and the like.

In operation, liquid feed at a relatively low temperature enters the enclosure through supply conduit 16 and overflows into downcomer 20. Tube sheet 18 prevents the liquid feed from entering the first annular space between the downcomer and the shell.

The liquid feed flows downwardly through second annular space 34, and, by reason of the diverter plate structure as already described, a substantial portion of the liquid flow is along the inside wall of the downcomer. The liquid leaves the bottom end of the downcomer, forms a pool in reservoir 44, and overflows through weirs 46 to pass through packing 48. The liquid leaving the bottom of the packing collects as a pool in the bottom of the enclosure and is heated by reboiler 52.

Heating of the liquid feed in the bottom of the stabilizer vaporizes the low-boiling components as well as some of the higher-boiling components. The heated vapors rise through packing 48 in direct countercurrent heat exchange relationship with downflowing liquid feed. Some condensation of higher-boiling components from the vapor occurs within the packing together with fractionation of the stream components.

The partially cooled vapors leaving the top of packing 48 rise through the second annular space and are distributed by packing 29 within vapor passages 28 between the heat exchange fins in the first annular space. Flow of the vapor through these passages results in substantial indirect heat exchange with the cool liquid feed downwardly flowing along the inner wall of the downcomer. In this section, condensation of higher-boiling components in the vapor occurs together with fractionation of the liquid. The condensed components fall back down into the packing. The vapors, substantially stripped of higher-boiling components, pass through vapor tubes 22 into the top end of the enclosure. The stripped vapors are withdrawn as dry natural gas through overhead line 56.

By the apparatus and method as described herein, full advantage is taken of the relatively low temperature of liquid feed entering a stabilizer. As a result, heavier components are stripped from the gaseous product separated from natural gasoline. These heavier components are retained as part of the liquid product recovered from the bottom of the stabilizer.

It will be understood that for simplicity in description various accessories such as valves, pumps, and the like as well as obvious structural details have been omitted since the inclusion of these in the apparatus of the present invention will be obvious to those skilled in this art in view of the description of the invention which has been given.

I claim:
1. Apparatus for treating a multi-component liquid comprising:
  (a) an elongate vertical shell closed at its longitudinal ends to form an enclosure;
  (b) a tubular downcomer disposed coaxially within the shell to form a first annular space between the shell and the downcomer;
  (c) means disposed within the downcomer to form a second annular space between said means and the downcomer,
    (i) the second annular space extending over a substantial vertical length of the downcomer;
  (d) a liquid feed conduit communicating with the enclosure above the downcomer;
  (e) means for directing liquid feed from the conduit into the second annular space;
  (f) means within the second annular space to distribute downflowing liquid feed within the downcomer;
  (g) packing below the downcomer for distributing liquid flowing downwardly out of the downcomer and toward the bottom of the enclosure;
  (h) heating means for heating liquid in the bottom of the enclosure to vaporize components of the liquid;
  (i) means for directing the vaporized components to pass through the packing;
  (j) means for directing the vaporized components from the packing to the first annular space to enable heat exchange and fractionation between downwardly flowing liquid feed and the vaporized components; and
  (k) a gas outlet near the top of the enclosure for removing vaporized components.

2. Apparatus for treating a multi-component liquid comprising:
  (a) an elongate vertical shell closed at its longitudinal ends to form an enclosure;
  (b) a tubular downcomer disposed coaxially within the shell to form a first annular space between the shell and the downcomer;
  (c) a closed tubular element coaxially disposed within the downcomer to form a second annular space between the tubular element and the downcomer,
    (i) the second annular space extending over a substantial vertical length of the downcomer;
  (d) a liquid feed conduit communicating with the enclosure above the downcomer;
  (e) means for directing liquid feed from the conduit into the second annular space;
  (f) a series of vertically spaced baffles within the second annular space to distribute downflowing liquid feed as a film along the inner wall of the downcomer;
  (g) packing disposed below the downcomer for distributing liquid flowing downwardly out of the downcomer and toward the bottom of the enclosure;
  (h) heating means below the packing for heating liquid in the bottom of the enclosure to vaporized components of the liquid;
  (i) means for directing the vaporized components to pass through the packing;

(j) means for directing the vaporized components from the packing to the first annular space to enable heat exchange and fractionation between the downwardly flowing liquid feed and the vaporized components; and (k) a gas outlet near the top of the enclosure for removing vaporized components.

3. An apparatus for treating a multi-component liquid comprising:

(a) an elongate vertical shell closed at its longitudinal ends to form an enclosure;

(b) a tubular downcomer disposed coaxially within the shell to form a first annular space between the shell and the downcomer;

(c) a plurality of vertical fins secured to the outer wall of the downcomer to extend radially into the first annular space;

(d) fluid flow distributing means in the first annular space between each of the fins;

(e) means coaxially disposed within the downcomer to form a second annular space between said means and the downcomer,
    (i) the second annular space extending over a substantial vertical length of the downcomer;

(f) a liquid feed conduit communicating with the enclosure above the downcomer;

(g) means for directing liquid feed from the conduit into the second annular space;

(h) a series of vertically spaced baffles within the second annular space to distribute downflowing liquid feed along the inner wall of the downcomer;

(i) packing disposed below the downcomer for distributing liquid flowing downwardly out of the downcomer and toward the bottom of the enclosure;

(j) heating means below the packing for heating the liquid in the bottom of the enclosure to vaporize components of the liquid;

(k) means for directing the vaporized components to pass through the packing;

(l) means for directing the vaporized components from the top of the packing to the first annular space to enable heat exchange and fractionation between the downwardly flowing liquid and the vaporized components; and (m) a gas outlet near the top of the enclosure for removing vaporized components.

References Cited by the Examiner

UNITED STATES PATENTS 2,995,499   8/1961   Dukler et al. _____ 208—353
3,191,916   6/1965   Kurpit et al. _____ 202——158

DELBERT E. GANTZ, *Primary Examiner.*